United States Patent [19]

Hoashi et al.

[11] Patent Number: 5,548,732
[45] Date of Patent: Aug. 20, 1996

[54] BUS ADAPTER FOR TRANSFERRING SIGNALS BETWEEN A MASTER UNIT AND A SLAVE UNIT, AND SYSTEM INCLUDING THE BUS ADAPTER

[75] Inventors: Kouich Hoashi; Akinori Aoki; Isamu Suzuki, all of Hadano, Japan

[73] Assignee: Hitachi, Ltd., Tokyo, Japan

[21] Appl. No.: 5,274

[22] Filed: Jan. 19, 1993

[30] Foreign Application Priority Data

Jan. 16, 1992 [JP] Japan .................................. 4-005762

[51] Int. Cl.[6] .............................. G06F 13/00; G06F 13/42
[52] U.S. Cl. ...................... 395/285; 395/309; 395/200.2; 370/85.1; 364/240; 364/240.2; 364/238.2; 364/239.9; 364/260; 364/260.1; 364/DIG. 1
[58] Field of Search ....................................... 395/325, 275, 395/725, 800, 285, 308, 306, 288, 726, 200.2, 290, 309, 823; 370/85.2, 85.1, 85.13; 340/825.5

[56] References Cited

U.S. PATENT DOCUMENTS

| | | | |
|---|---|---|---|
| 4,700,292 | 10/1987 | Campanini | 395/200.2 |
| 4,864,496 | 9/1989 | Triolo et al. | 395/325 |
| 4,975,838 | 12/1990 | Mizuno et al. | 395/275 |
| 5,029,074 | 7/1991 | Maskas et al. | 395/309 |
| 5,072,369 | 12/1991 | Theus et al. | 395/425 |
| 5,191,653 | 3/1993 | Banks et al. | 395/275 |
| 5,191,657 | 3/1993 | Ludwig et al. | 395/325 |
| 5,193,204 | 3/1993 | Qureshi et al. | 395/800 |
| 5,253,348 | 10/1993 | Scalise | 395/325 |
| 5,276,814 | 1/1994 | Bourke et al. | 395/285 |
| 5,305,442 | 4/1994 | Pedersen et al. | 395/325 |
| 5,309,567 | 5/1994 | Mizukami | 395/290 |
| 5,321,819 | 6/1994 | Szczepanek | 395/325 |
| 5,388,216 | 2/1995 | Oh | 395/849 |

FOREIGN PATENT DOCUMENTS 2-116947  5/1990  Japan ............................ G06F 13/42

OTHER PUBLICATIONS

Motorola, VME Bus Specification Manual Revision C. 1, 1985, pp. 54–55.
American National Standard x 3, 131 199 x", 1986 Small Computer System Interface (SCSI–II), pp. 43–46, Nov. 11, 1991.

*Primary Examiner*—Gopal C. Ray
*Attorney, Agent, or Firm*—Fay, Sharpe, Beall, Fagan, Minnich and McKee

[57] ABSTRACT

Handshake control for data transfer in a computer system having a master unit connected to a bus adapter through an expansion bus, which bus adapter is connected to slave units through a main bus, is partly accomplished in the bus adapter to increase data transfer speed for the interlock mode. The bus adapter exercises control in such a way as to set the data strobe signal on condition that a data strobe output permission signal has been asserted and that at least one of a data strobe suppression pulse signal and a data acknowledge signal has been negated and to reset the data strobe signal when the data strobe suppression pulse signal is asserted. The transmission of the data suppression pulse signal is made by detecting the rise of the data acknowledge signal in the master unit and is asserted for a fixed time or pulse width corresponding to system standards.

26 Claims, 7 Drawing Sheets

BUS ADAPTER FOR TRANSFERRING SIGNALS BETWEEN A MASTER UNIT AND A SLAVE UNIT, AND SYSTEM INCLUDING THE BUS ADAPTER

BACKGROUND OF THE INVENTION

The present invention relates to data transfer within a computer system, wherein a master unit transfers data with a slave unit over a bus using the interlock method employing a data strobe signal and a data acknowledge signal.

Data transfer between a master unit and a slave unit via a bus has been described to in, for example, "Motorola, VME Bus Specification Manual Revision C. 1, " 1985, pages 54 & 55. This technique relates to the interlock method implemented by letting a data strobe signal handshake with a data acknowledge signal.

An example of a different technique is disclosed in the "Draft proposed AMERICAN NATIONAL STANDARD ×3. 131 199 ×", 1986 Small Computer System Interface (SCSI-II), pages 43–46 dated Nov. 11, 1991. This technique relates to synchronous data transfer, which uses an offset interlock method by which a fixed number of data strobes precede data acknowledgment.

SUMMARY OF THE INVENTION

It is an object of the present invention to analyze the known prior art techniques used in data transfer, to identify problems associated therewith, and to solve such problems.

The offset interlock method is intended to prevent or limit the decrease in data transfer speed due to propagation of a control signal that is typical in the interlock method, by providing both the master and slave units with corresponding data buffers to offset propagation time in the interface. However, the problem in the offset interlock method is that there is a necessity to provide complicated control, which incurs increased hardware cost.

It is an object of the present invention to solve such technical problems and to provide a data transfer system capable of reducing the decrease in data transfer speed due to delay in the propagation of control signals peculiar to the interlock method, while restraining an increase in hardware cost and without complicated control. The object is specifically achieved with the present invention by controlling part of the handshaking of a data strobe signal and a data acknowledge signal on a bus adapter, as opposed to the control being totally within the master unit as in the known interlock method.

BRIEF DESCRIPTION OF THE DRAWINGS

Further objects, features and advantages of the present invention will become more clear from the following detailed description of a preferred embodiment, shown in the drawing, wherein.

DETAILED DESCRIPTION OF THE PREFERRED EMBODIMENT

Like numerals and representations throughout the drawings are used for like elements.

As mentioned above, the interlock method is known wherein a data strobe signal from a master unit handshakes with a data acknowledge signal.

Figure 6:
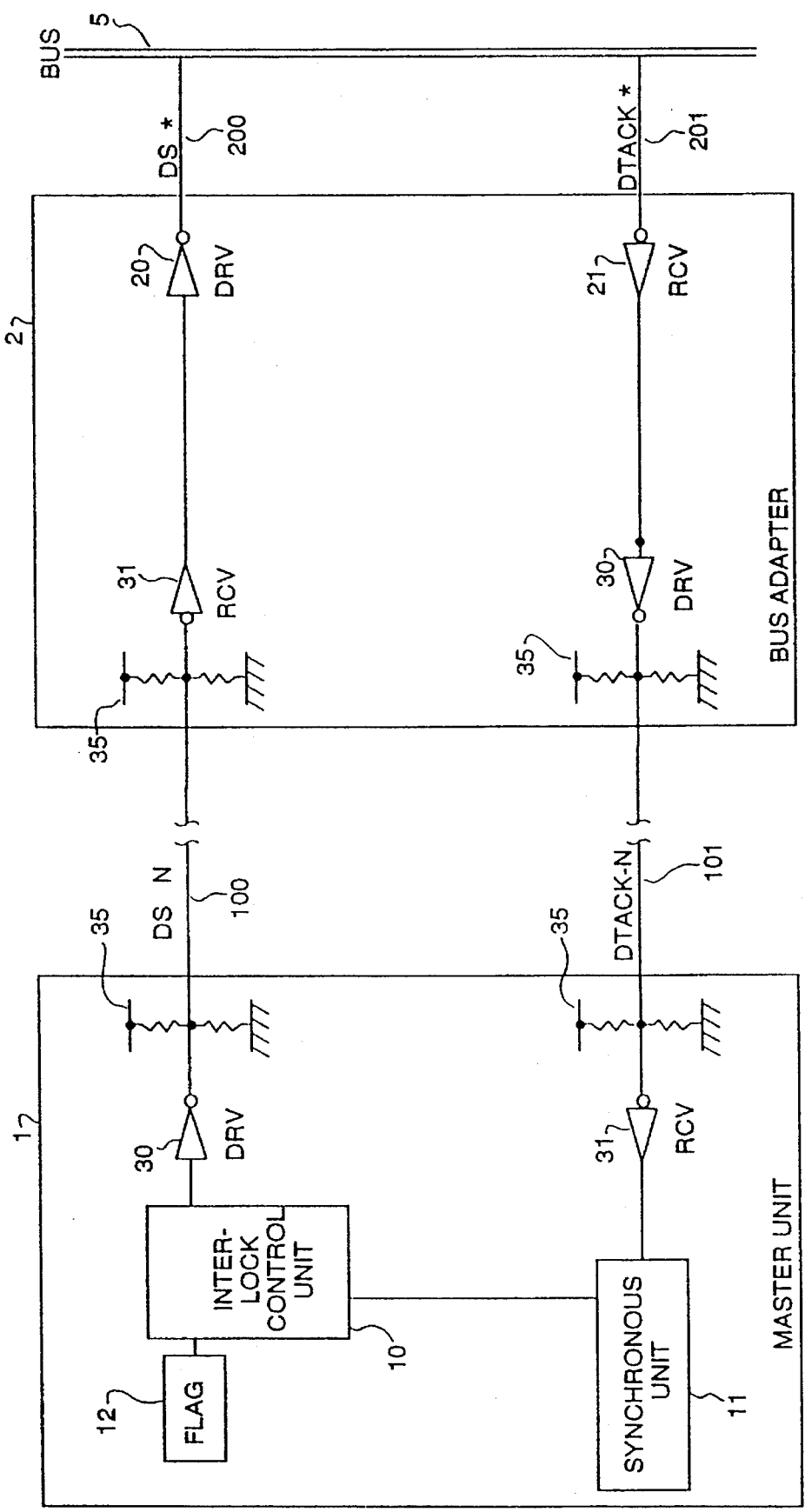
FIG. 6 is a block diagram, in greater detail, of the master unit and bus adapter shown in FIG. 5.
Figure 5:
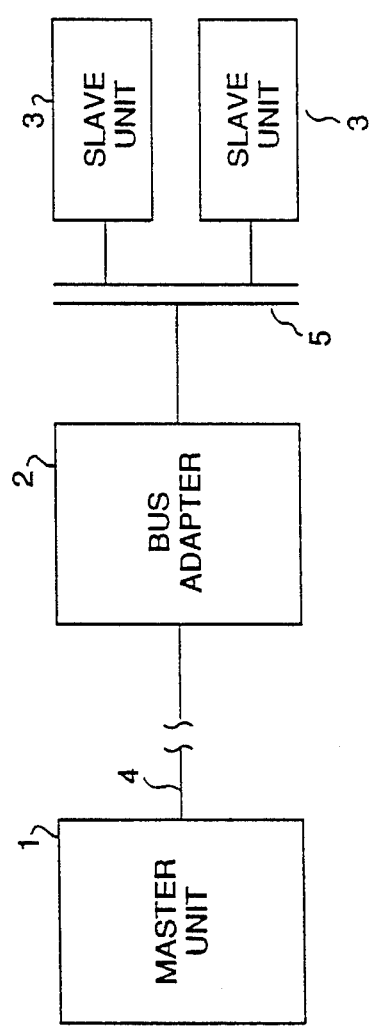
FIG. 5 is a block diagram of a computer system for carrying out data transfer with the interlock method.
Figure 7:
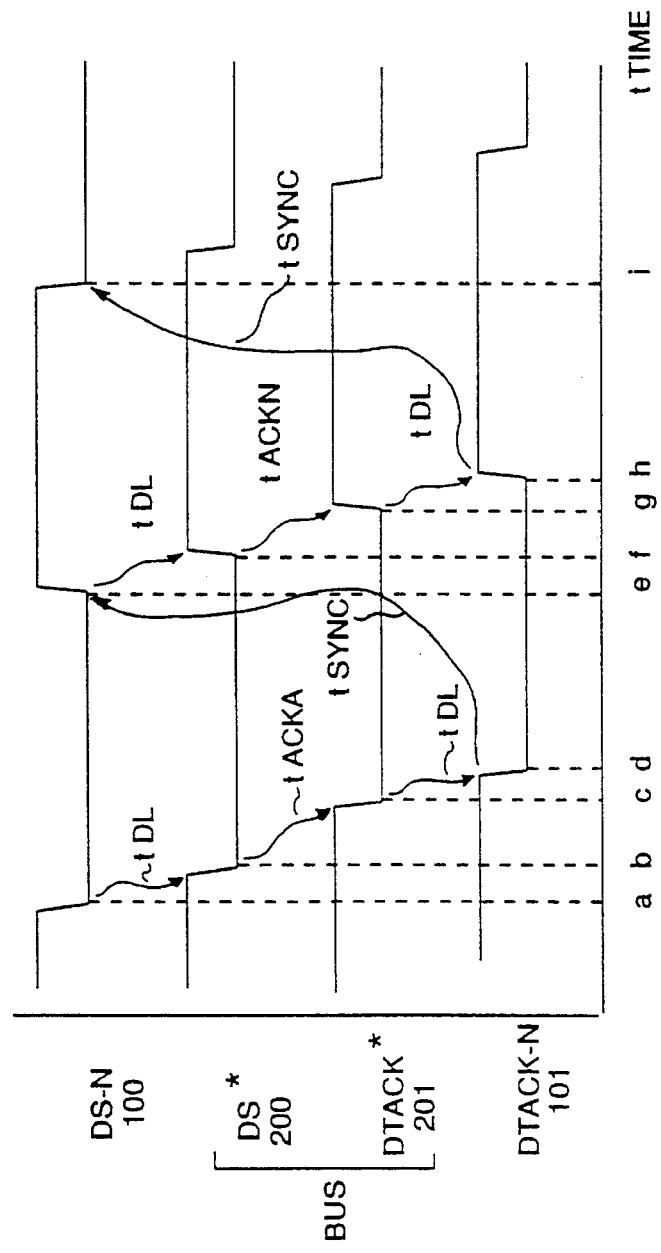
FIG. 7 is a synchronized timing chart explanatory of the operation of the system shown in FIGS. 5 and 6.

The present invention includes the analysis of the interlock method, according to FIGS. 5–7, along with the identification of problems associated with such an interlock method. Therefore, prior to describing applicants' solution, the interlock method of FIGS. 5–7 will be analyzed.

FIG. 5 is a block diagram illustrating an example of a computer system in which data is transferred between a master unit 1 and one of a plurality of slave units 3 via a main bus 5 in an interlock method (that is an interlock mode) using a data strobe signal and a data acknowledge signal. FIG. 6 shows the master unit 1 and the bus adapter 2 in greater detail. FIG. 7 shows the wave form of various signals within the computer system of FIGS. 5 and 6, synchronized with respect to each other for illustrating the operation of the interlock method.

As shown in FIG. 5, the master unit i is connected through an expansion bus 4 and bus adapter 2 to the main bus 5 and slave units 3. The master unit 1 controls the main bus 5 through the bus adapter 2, with the expansion bus extending between the master unit 1 and the bus adapter 2 so that the interlock mode may be used for carrying out data transfer with the slave units 3. The system shown assumes that the distance of propagation provided by the expansion bus 4 exceeds the maximum distance determined by the standard of the main bus 5, and even when the master unit 1 is directly connected to the slave unit 3, the data transfer performance hardly improves because of such maximum distance determined by the standard of the main bus 5.

The main bus 5 may be a VME bus (including both control signal lines and data lines) and the expansion bus 4 may be a simple cable. When an I/O unit is provided as the slave unit 3, the bus adapter 2 is an I/O I/F adapter, the main bus 5 is an I/O interface, and the expansion bus 4 is an expansion I/O interface, as a specific example.

In the computer system thus configured, the bus adapter 2 includes only drivers DRV 20, 30 and receivers RCV 21, 31 as shown in FIG. 6, in order to provide electrical matching between the expansion bus 4 and the main bus 5. Moreover, interlock control is exercised on only the master unit side when data is transferred in this computer system, that is it is only the master unit 1 that exercises the interlock control.

In FIG. 6 various signals have been shown in the diagram on respective lines of the buses 4,5, and the wave forms of such signals are shown in FIG. 7. The expansion bus 4 includes the lines 100 and 101, while lines 200 and 201 may be considered a part of the main bus 5. In the drawings and in the following description, a star * indicates an active low signal that is asserted as a low voltage, "false", "0", etc. A signal without a "*" is an active high signal asserted as a high voltage, "true", "1" etc. In FIG. 6, a data strobe signal DS-N is on line 100 and a data acknowledge signal DTACK-N is on line 101 of the expansion bus 4. A data acknowledge signal DTACK, is on line 201 and a data strobe signal DS* is on line 200 of the main bus 5. The driver DRV 20 and the receiver RCV 21 of bus adapter 2 meet the electrical specifications of the main bus 5, whereas the driver DRV 30 and the receiver RCV 31 meet the electrical specifications of the expansion bus 4. The expansion bus 4 is terminated with resistors 35 at both ends.

The data acknowledge signal DTACK-N 101 that is applied from the expansion bus to the master unit 1 is synchronized by the rise/fall synchronous logic unit 11 with the timing of the master unit 1. An interlock control unit 10 receives the output of the synchronous logic unit 11 if a data transfer enable flag 12 is true, for example high in voltage. The interlock control unit 10 will assert a high data strobe signal DS-N on line 100 when the data acknowledge signal DTACK-N on line 101 goes low. The interlock control unit 10 will negate the data strobe signal DS-N on line 100, that is provide a logic low DS-N, when the data acknowledge signal DTACK-N 101 is asserted as a high voltage.

A data transfer bus, not shown in the drawing because it is conventional, will transfer data when the data strobe signal DS-N is high, that is asserted.

FIG. 7 is a timing chart showing synchronized wave forms for the various signals illustrating a handshaking operation at the time of data transfer with the aforementioned computer system operating in the interlock mode. In FIG. 7, DS-N on line 100 is shown with respect to its timing at the output of the master unit 1, DTACK-N on line 101 is shown with respect to its timing at the input of the master unit 1, and DS* on line 200 and DTACK, on line 201 are shown with respect to their timing on the bus 5 at its connection with the bus adapter 2.

In the above notation, in general, when a specific signal has its name written only to include "-N" or "*" it is a negative logic signal, i.e. logic "0" or "false". Such signals are negated when changed from their asserted active level.

As shown in FIG. 7, signal propagation delay time TDL is needed in the computer system of FIG. 6 due to delay in the cables of the expansion bus 4, the drivers 30, 20 of the bus adapter 2 and the receivers 31, 21 of the bus adapter 2, which delay is between the output of the master unit 1 and main bus 5. Moreover, tACKA and tACKN are needed as the response time of the slave unit 3, whereas tSYNC is needed as the processing time of synchronous logic unit 11, the interlock control unit 10, the driver 30 and the receiver 31 of the master unit 1. A data transfer cycle is repeated a number of times for data transfer. Analysis will be made assuming that one cycle will be between adjacent falling edges of the data strobe signal, DS-N, and therefore the time of one data transfer cycle will be as follows:

tCYCLE=(2 X tSYNC)+tACKA+tACKN +(4 X tDL), wherein tCYCLE defines the transfer time of one cycle in the computer system of FIGS. 5–7 for data transfer. This transferring time of one cycle is such that when the cable of the expansion bus 4 is lengthened, tDL increases with the disadvantageous result of reducing data transfer performance of the computer system.

Therefore, it is seen that the data transfer cycle in accordance with the wave form shown in FIG. 7 starts with the left-handmost falling edge of the data strobe signal DS-N at time a at the output of the master unit 1. The signal DS-N propagates through line 100 of the expansion bus 4 and through receiver 31 and driver 20 of bus adapter 2 within the delay time tDL to produce the falling edge of the signal DS* at time b for the output of the bus adapter on line 200 of main bus 5. The appropriate slave unit 3 attached to main bus 5 responds to the signal DS* within response time tACKA at time c to produce the falling edge of the DTACK* signal on line 201 of bus 5 at the input of the bus adapter 2. From time c to time d there is another propagation delay tDL for propagation through the receiver 21 and driver 30 of the bus adapter 2 as well as the length of the line 101 of expansion bus 4. At time d, at the input of the master unit 1, the signal DTACK-N drops. During the processing time tSYNC from time d to e processing delay is caused by receiver 31, synchronous logic unit 11, interlock control unit 10 and driver 30 within the master unit 1 to thereby output the rising edge of signal DS-N at time e. Again, the signal DS-N travels along line 100 and through receiver 31 and driver 20 of bus adapter 2 within the delay time tDL so that the leading edge of the signal DS* arrives on line 200 of main bus 5 at time f. The slave unit 3 responds within processing time tACKN to provide the rising edge of DTACK* at time g on line 201 of the input of the bus adapter 2. Again, there is the propagation delay tDL from time g to time h through the receiver 21 and driver 30 of the bus adapter 2 and through the length of line 101 of the expansion bus 4 to provide the rising edge of DTACK-N at time h at the input of the master unit 1. Response time for synchronization within the master unit 1, tSYNC is needed for processing by receiver 31, synchronous logic unit 11, interlock control unit 10 and driver 30 within the master unit 1 to produce the falling edge of DS-N at the output of the master unit 1 on the line 100 of the expansion bus 4 at the time i, to complete one cycle of data transfer.

The aforementioned description of the synchronized wave forms and the timing diagram of FIG. 7 pertains only to the handshake operation between the master unit 1 and slave unit 3 on the control bus, and it is to be understood that actual data is transferred via the data bus (not shown) in synchronization with the aforementioned handshake operation in a known manner. For example, actual data could be transferred during the active low portion of the wave form of DS*.

The aforementioned interlock method or mode simplifies the control operation. When the distance between the master unit 1 and the slave unit 3 is long, however, the delay tDL (the transmission time of the data strobe signal and the data acknowledge signal through the expansion bus and bus adapter) tends to account for a large percentage of the transfer time on the interface connecting the master unit 1 to the slave unit 3. This results in the problem that the data transfer speed is correspondingly reduced.

The offset interlock method or mode is intended to prevent such decrease in the data transfer speed due to the propagation delay of the control signals typical of the interlock method or mode, by providing both the master and slave units with corresponding data buffers to offset the propagation time of the interface. However, the use of buffers for this offset has the problem of necessarily complicating the control and incurring an increase in hardware cost.

The preferred embodiment of the present invention is intended to solve such technical problems to provide a data transfer system capable of reducing the decrease in data transfer speed due to delay in the propagation of control signals peculiar to the interlock method or mode, while restraining an increase in hardware cost without complicated control. This is accomplished by controlling part of the handshake of a data strobe signal and a data acknowledge signal in the bus adapter in accordance with the preferred embodiment of FIGS. 1–4, which is in contrast to the interlock mode just described with respect to FIGS. 5–7 wherein the handshaking of the data strobe signal and the data acknowledge signal is totally controlled in the master unit.

According to the preferred embodiment of the present invention, the detection of the negation of the data acknowledge signal and the assertion of the data strobe signal that follows from such detection are accomplished in the bus adapter according to the computer system of FIGS. 1–4, whereas in the computer system of FIGS. 5–7 such is only accomplished in the master unit. Therefore, data propagation time of the interface between the master unit and the slave unit can be reduced.

Figure 1:
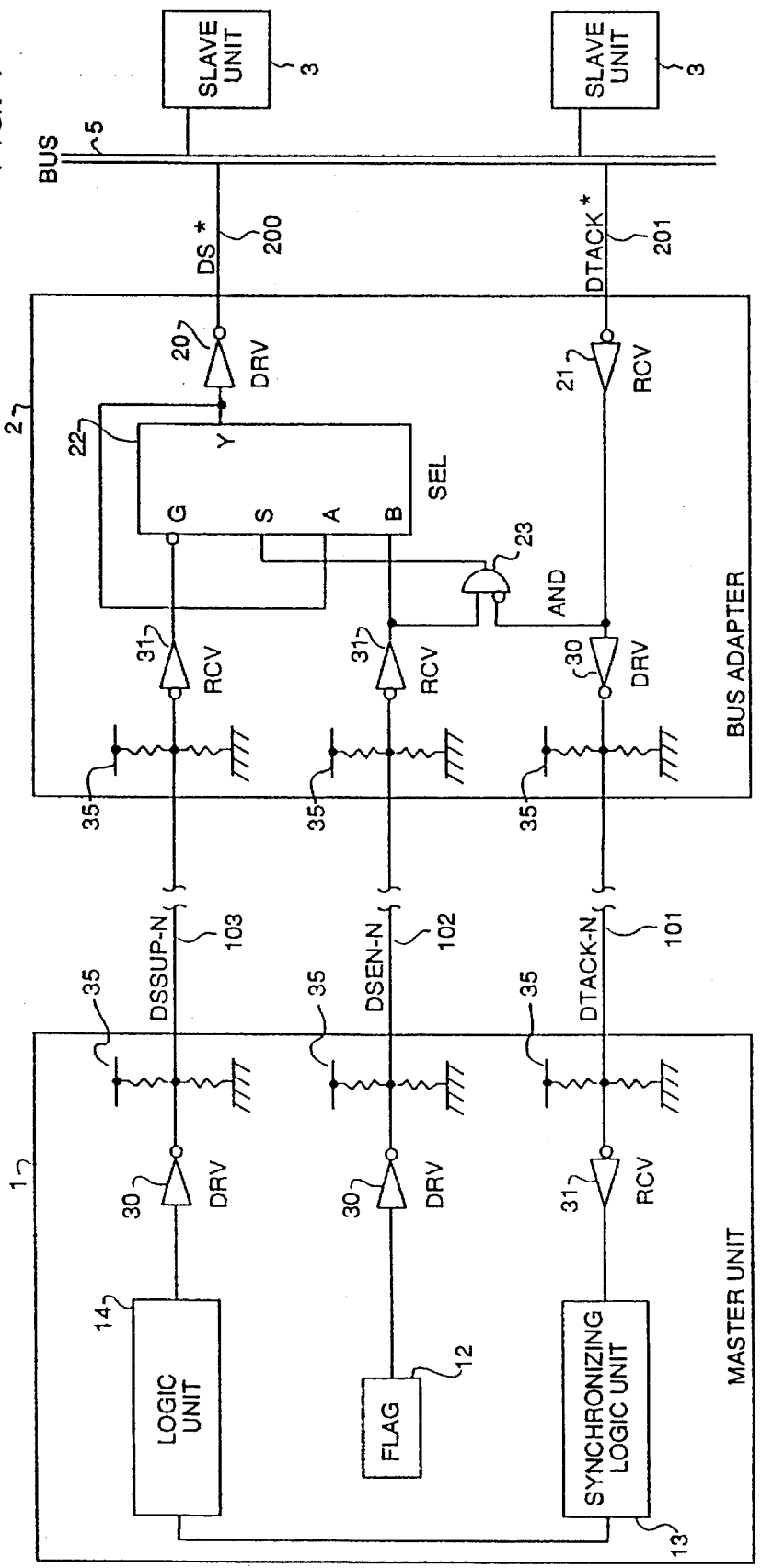
FIG. 1 is a block diagram of a computer system employing a master unit and a bus adapter embodying the present invention.

In the preferred embodiment of the present invention as shown in FIG. 1, a data strobe enable signal DSEN-N is on line 102 of the expansion bus 4, a pulsed data strobe suppression signal DSSUP-N is on line 103 of expansion bus 4 and a data acknowledge signal DTACK-N is on line 101 of the expansion bus 4, and together these signals are the expansion bus control signals. The bus adapter 2 is provided with AND gate 23 and a selector 22 that is preferably constructed as a latch, for example Hitachi, Ltd. selector HD74S157. The master unit 1 is provided with a rise synchronizing logic unit 13 for receiving the data acknowledge signal DTACK-N on line 101 of the expansion bus to synchronize the same with the master unit timing and feed it to logic unit 14 for generating the data strobe suppression pulse signal DSSUP-N on line 103 of the expansion bus. DSSUP-N allows a minimum time for data set-up, i.e. for stabilizing the bus after a data change. As in the computer system already described with respect to FIGS. 5–7, the master unit 1 and the bus adapter 2 have terminating resistors 35, drivers DRV 20, 30 and receivers RCV 21, 31. The bus adapter is connected to the main bus 5 by line 201 carrying the signal DS* and line 200 carrying the signal DTACK*. The plurality of slave units 3 are also provided on the main bus 5.

Figure 2:
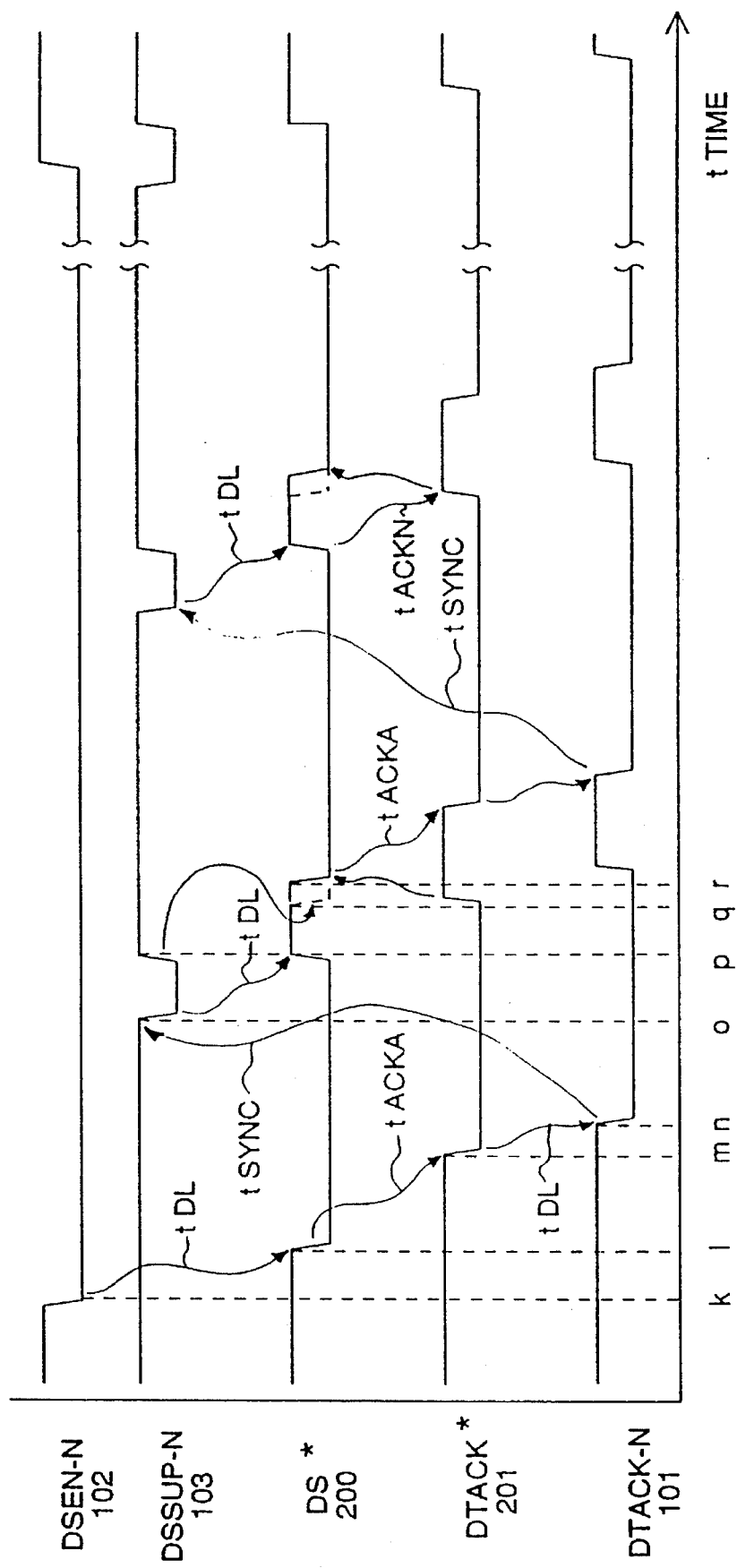
FIG. 2 is a synchronized timing chart explanatory of the operation of the system shown in FIG. 1.

In the timing chart of FIG. 2, DSEN-N on line 102 and DSSUP-N on line 103 are shown as they appear with reference to the timing at the output of the master unit 1. DS and DTACK* are shown with reference to their timing on main bus 5 at the bus adapter 2. DTACK-N is shown with reference to its timing at the input of the master unit 1. With reference to the timing chart of FIG. 2, the operation of the preferred embodiment shown in FIG. 1 for the present invention will be described.

In the embodiment of the present invention as shown in FIG. 1, data transfer is started by asserting a true or high level for the data transfer enable flag 12 of the master unit 1. Due to the inverting driver 30, the rising edge of the asserted flag 12 appears as a falling edge at time k for the signal DSEN-N in FIG. 2. DSEN-N is held low throughout the data transfer that employs one or more data transfer cycles, each for a duration tCYCLE. Thus, the low of DSEN-N is inverted by receiver 31 of bus adapter 2 to be applied as a high to the input terminal B of selector 22 and also to be applied to the top terminal of AND gate 23 in the bus adapter 2. Further, the AND gate 23 produces a high output since DTACK* is not asserted at the beginning of the data transfer. That is, the active low DTACK* is high at this time k and time 1, which is tDL after k; the high signal from line 201 is inverted by the receiver 21 of the bus adapter 2 to provide it as a low signal to the active low bottom terminal of AND gate 23. With a high as the output from the AND gate 23 at times k and l being applied to the selector terminal S of selector 22, the selector 22 will select input B as its output Y, and therefore the output Y becomes high. As shown in FIG. 1, the output Y is fed back as the input A of the selector 22. With a high signal as the output Y being inverted by the driver 20 of the bus adapter 2, the active low data strobe signal DS* is asserted as a low signal on line 200 for the main bus 5 at time 1 and sent by the main bus 5 to the intended slave unit 3. Within the response time tACKA of the slave unit 3 between the assertion of the active low DS* at time l in FIG. 2 to the assertion of the active low data acknowledge signal DTACK, on line 201 of the main bus 5 at time m, the slave unit performs its processing as previously described with respect to FIGS. 5–7. The falling edge of DTACK* at time m at the input to the bus adapter 2 passes through the receiver 21 and driver 30 of the bus adapter as well as along the line 101 of expansion bus 4 to provide the falling edge of DTACK-N on the input of the master unit 1 at time n after the propagation delay tDL, the time period between times m and n. This falling edge of DTACK-N is inverted by the receiver 31 of the master unit 1 and detected as a rising edge by the rise synchronizing logic unit 13 that will thereby cause the logic unit 14 to produce the falling edge of DSSUP-N on line 103 at time o according to the timing of the master unit 1; the time period between n and o in FIG. 2 is the processing time tSYNC for signal processing by the receiver 31, synchronizing logic unit 13, logic unit 14 and driver 30 of the master unit 1. The falling edge of DSSUP-N at time o is propagated along the line 103 of expansion bus 4 and through inverting receiver 31 of bus adapter 2 to arrive as a rising edge at the active low terminal G on selector 22.

On the other hand, at time m, when DTACK* is asserted, i.e. drops to a low level and is inverted by receiver 21 of bus adapter 2 to apply a high level to the active low terminal of AND gate 23, the AND gate 23 will thereby produce a low output to the selector terminal S of the selector 22 to thereby select the input terminal A as the output Y of the selector 22. As the input A of the selector 22 is directly connected to the output Y, selector 22 latches the value of the current output Y, that is a high is maintained at the output Y for the selector 22 to maintain DS* asserted as low at about time n.

Furthermore, the pulse generating logic unit 14 in the master unit 1 generates the falling edge of data strobe suppression pulse signal DSSUP-N 103 when the data acknowledge signal DTACK-N 101 is inverted at the receiver 31 and rises at the input of the synchronizing logic unit 13, as explained previously at time o. The smallest pulse width, time o to time p, of the data strobe suppression pulse signal DSSUP-N is set in the master unit 1 so as to assure the least negation time (time p to time q) of the data strobe signal DS* on line 200 as determined by the standard of the bus 5.

The selector 22 has an output enable control input G, which is active low so that when a low signal is applied to the input G, the selected input A or B will become the output Y as determined by the signal at S; when a high signal is applied to the active low input G, the output Y of the selector will be held low, that is the selector will be disabled regardless of the value of the inputs S, A or B.

Between times o and p in FIG. 2, DSSUP-N is low, which low will be inverted by receiver 31 of bus adapter 2 to apply a high to the input G after the delay tDL caused by propagation of DSSUP-N through the line 103 of expansion bus 4 and through the receiver 31, selector 22 and driver 20 of bus adapter 2, so that DS* on line 200 is held high between times p and q, with the dotted line for DS* indicating the least pulse width of DS* that would be determined by the least pulse width time o to time p for DSSUP-N mentioned above. Thereby, the least negation time of the data strobe signal DS* on line 200 (that is the time period between times p and q in FIG. 2 during which DS, is held high) can thus be assured to meet standards such as the standard of main bus 5. At time q note that DTACK* is low and will produce a low as the output of AND gate 23 for the selector input S, which has the affect of selecting the input A as the output Y; since at time q the output Y is low and being fed back to input A, the selector 22 will latch the low value output Y at time q so that the rise of DSSUP-N will be ineffective to assert DS* and DS* stays negated as a high at time q (thus the use of dotted lines). The data strobe suppression pulse signal DSSUP-N on line 103 also acts as a latch resetting condition. While the input A has been selected by the selector 22 at time q, that is, while the data acknowledge signal DTACK* 201 remains at its active low (that is it has not yet been negated to a high) the active low data strobe signal DS* on line 200 remains negated, that is it is high in accordance with the low output Y that is inverted by the driver 20.

Sometime after time m and the negation of DS* there is the processing time of the slave unit 3, tACKN, after which the slave unit acknowledges the data transfer by negating the active low data acknowledge signal DTACK* on line 201 (that is changing it from active low to a high) so that an output of the AND gate 23 then turns high to feed a high signal to the selector terminal S in the bus adapter 2. Then, the selector 22 selects the input B to be the output Y. At this time DSEN-N is at a low, which is inverted by the receiver 31 of bus adapter 2 so that the input B is a high and therefore this high is selected as the output Y of selector 22. Since the output Y is inverted by the driver 20 of bus adapter 2, the active low DS* is thereby asserted as a low signal so long as the data strobe suppression pulse signal DSSUP-N on line 103 is high and inverted by the receiver 31 of bus adapter 2 to become a low at the active low enable input G of the selector 22 after the delay tDL.

When the slave unit 3 negates the active low DTACK* on line 201 while the data strobe suppression pulse signal DSSUP-N on line 103 remains high so that it may be inverted to the active low of enable terminal G after the delay tDL, input selection will be A when DSEN-N is high and will be B when DSEN-N is low. As indicated by the straight arrow at about time r in FIG. 2, DS* will be asserted low because output Y is high because DSEN-N on line 102 is low to select input B, which is high due to the inversion by the receiver 31 of the signal DSEN-N in the bus adapter 2. In response to negation of DTACK*, the selector 22 directly asserts the DS* on line 200 with almost no delay at approximately time r to start the next data transfer cycle, which is controlled solely in the bus adapter; in contrast, the computer system of FIGS. 5–7 at the corresponding time g would transmit DTACK* with delay tDL to produce DTACK-N at master unit 1, which master unit 1 with processing time tSYNC would then produce DS-N that with delay tDL through bus adapter 2 finally asserts DS* on line 200, which means that the data transfer cycle of the computer system of FIGS. 5–7 is longer than the data transfer cycle of the computer system of FIGS. 1–4 by the just mentioned tDL, tSYNC, tDL, or (tSYNC+(2×tDL)).

Figure 3:
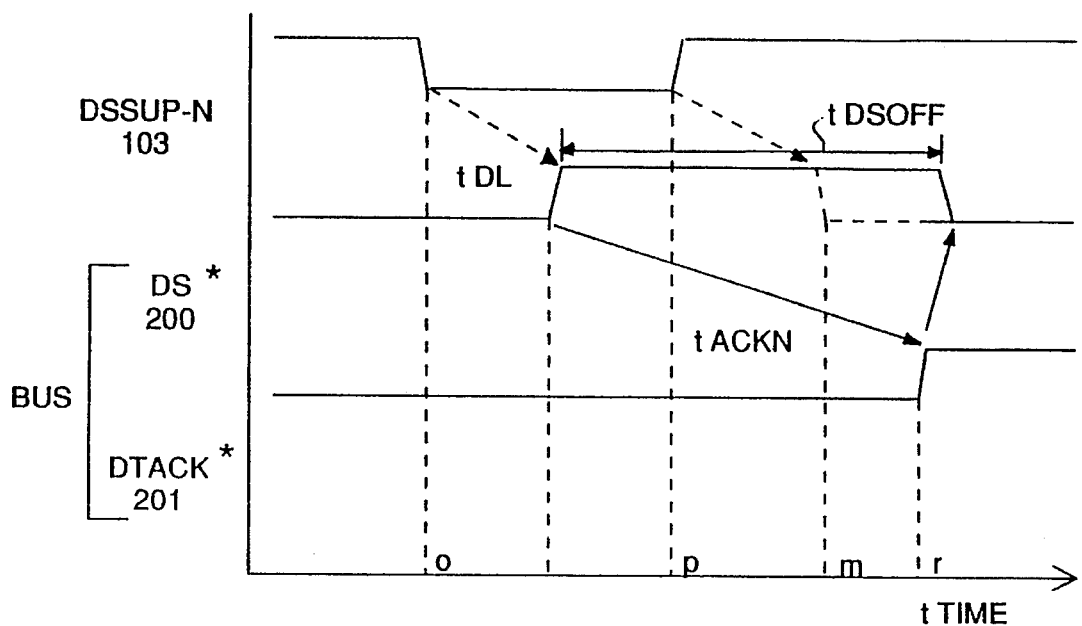
FIG. 3 is an enlarged portion of the timing chart of FIG. 2, in greater detail for a specific situation.
Figure 4:
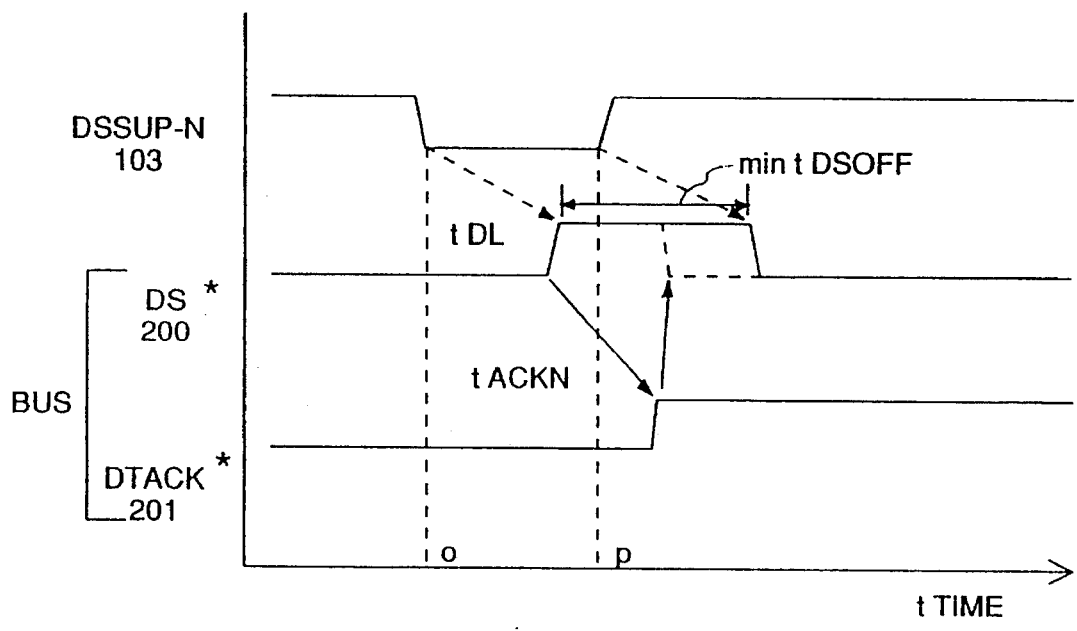
FIG. 4 is an enlarged portion of the timing chart of FIG. 2, in greater detail for a specific situation.

FIG. 3 is an enlargement of a portion of FIG. 2 including times o, p and r. FIG. 3 refers to the case where the least negation time of the data strobe signal DS* (caused by DSSUP-N being negated from time o to time p) on line 200 is shorter than the response time tACKN. Conversely, FIG. 4 shows the case where the least negation time (the time period when DSSUP-N is low) with delay tDL to DS* is longer than the response time tACKN. In FIGS. 3 and 4, tDSOFF refers to the negation time of the data strobe DS*, that is the time when DS* is high. It is thereby seen that in FIG. 4 the minimum tDSOFF is determined by DSSUP-N instead of DTACK* within tACKN that would have asserted DS* in accordance with the dotted lines; conversely, in FIG. 3 tDSOFF is determined by tACKN instead of by DSSUP-N that would have asserted DS* in accordance with the dotted lines. Thereby, it is seen that the longer of the least pulse width of the data strobe suppression pulse signal DSSUP-N and tACKN determines the time during which the data strobe DS* is negated or not asserted. The data strobe output enable signal DSEN-N on line 102 is set low for data transfer. Further data cycles will not be generated when DSEN-N goes high as shown in FIG. 2.

In the present invention, the least negation time of the data strobe signal DS, on line 200 is assured, irrespective of the response time tACKN of the slave unit 3, with the effect of ensuring the interlock mode in the bus adapter alone. Moreover, the data transfer time tCYCLE of one cycle in the preferred embodiment of the present invention is set forth in accordance with the following:

tCYCLE=tSYNC+tACKA+tACKN+(2 X tDL), that is the data transfer time of one cycle can be reduced by tSYNC +(2×tDL) as compared to the computer system of FIGS. 5–7, and this makes the preferred embodiment of FIGS. 1–4 accomplish data transfer at a higher speed.

| | COMPARISON (time in ns) | | | | |
|---|---|---|---|---|---|
| | tSYNC | tACKA | tACKN | tDL | tCYCLE |
| INVENTION | 500 | 300 | 200 | 100 | 1,200 |
| PRIOR ART | 500 | 300 | 200 | 100 | 1,900 |

The above example shows that the present invention can reduce the cycle time by 58% in a typical system.

Also, simple hardware may be used for generating the data strobe suppression pulse signal DSSUP-N on line 103 since this signal can be generated with a fixed negation width and a timing by differentiating the leading edge of the data acknowledge signal DTACK-N on line 101 in the synchronizing logic unit 13.

The preferred embodiment of the present invention as set forth in FIGS. 1–4 may be used for the expansion of a bus in a computer system and the bus-to-bus connection between cubic bodies in order to improve the throughput of data transfer.

Figure 8:
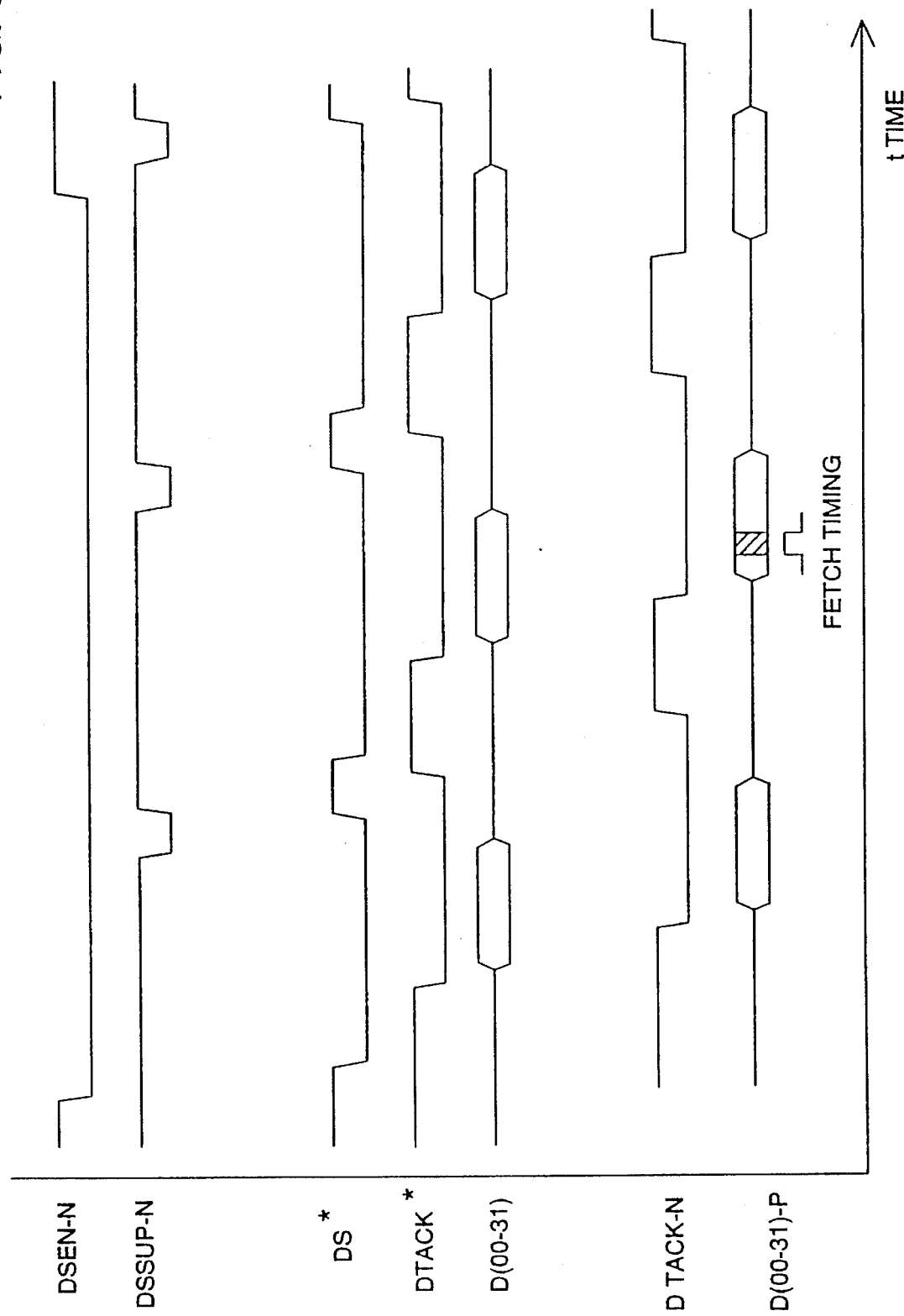
FIGS. 8 and 9 are synchronized timing charts of FIG. 2 for read and write, showing the data transfer.
Figure 9:
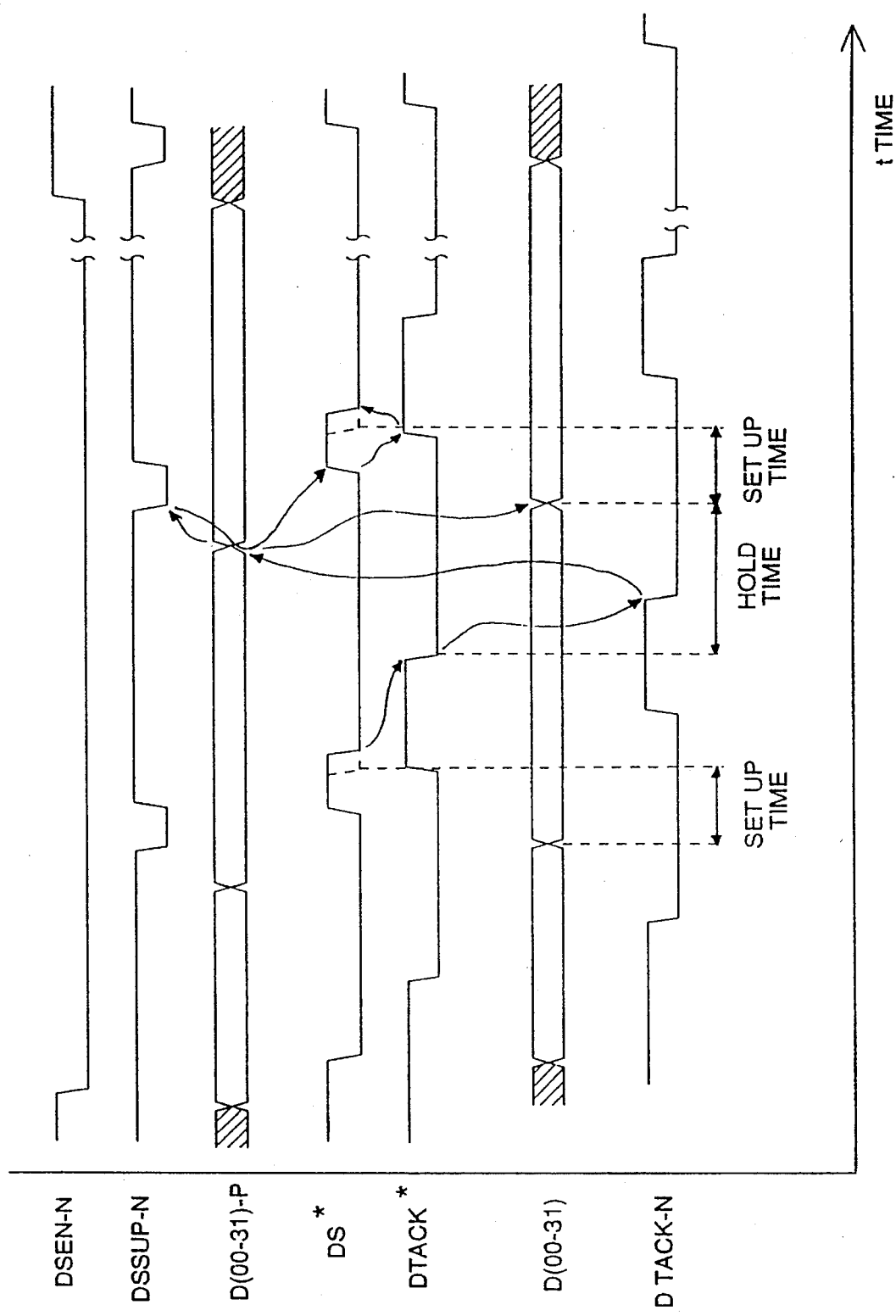

FIGS. 8 & 9 show an example of the read and write of data synchronized with the previously described control signals, in standard format so that further description is not necessary.

As set forth above, the influence of a decrease in data transfer speed due to delay in the reciprocation of control signals common to the interlock method for handshake is reduced under control without complication and with a restrained increase in hardware cost so that the synchronizing time of the interface signal is curtailed. Therefore, high speed data transfer is made possible with the present preferred embodiment.

While a preferred embodiment has been set forth with specific details, further embodiments, modifications and variations are contemplated according to the broader aspects of the present invention, all as determined by the spirit and scope of the following claims.

We claim:

1. A computer system, comprising:

a master unit;

a bus adapter;

an expansion bus connected directly between said master unit and said bus adapter;

a slave unit; and a main bus connecting said slave unit with said bus adapter;

said master unit having means for sending a data strobe enable signal over said expansion bus to said bus adapter;

said bus adapter having means responsive to receipt of a first data acknowledgment signal from said slave unit over the main bus for sending a second data acknowledgment signal over the expansion bus to the master unit;

said master unit having means responsive to said second data acknowledgment signal received from said bus adapter for sending a data strobe suppression signal over said expansion bus to said bus adapter; and said bus adapter having means responsive to the data strobe enable signal from said master unit and at least one of the first data acknowledgment signal from said slave unit and the data strobe suppression signal from said master unit for generating and transmitting a data strobe over said main bus to said slave unit.

2. The computer system of claim 1, wherein said slave unit has means responsive to the data strobe from said bus adapter transmitted over said main bus for accomplishing data transfer and means for sending the first data acknowledgment signal over said main bus to said bus adapter within a time tACKA after receipt of the data strobe.

3. The computer system of claim 2, wherein said bus adapter has a receiver and a driver that together with said expansion bus transmit the second data acknowledgment signal to said master unit with a time delay tDL;

wherein said means for sending of said master unit produces the data strobe suppression signal in response to said master unit receiving the second data acknowledgment signal over said expansion bus within a processing time tSYNC;

said bus adapter providing the data strobe on said main bus within a time tDL after receipt of the data strobe suppression signal from said master unit;

said slave unit producing the first data acknowledgment signal on said main bus at said bus adapter within a processing time tACKN after said bus adapter places the data strobe on said main bus; and said means of said bus adapter reasserting the data strobe on said main bus in direct response to receipt of the first data acknowledgment signal from said main bus independently of transmission of the second data acknowledgment signal from said bus adapter to said master unit so that one complete data transfer cycle is accomplished within the time tCYCLE=tACKA+tDL+tSYNC+tDL+ the greater of tACKN and the time width that the data strobe suppression signal is negated.

4. The computer system of claim 2, wherein said bus adapter has a receiver and a driver that together with said expansion bus transmit the second data acknowledgment signal to said master unit with a time delay tDL;

said means of said master unit uses the second data acknowledgment signal from said expansion bus only for synchronizing the timing of the data strobe suppression signal and asserts the data strobe suppression signal for a fixed pulse width.

5. The computer system of claim 4, wherein said master unit asserts the data strobe suppression signal for a pulse width set to assure the least negation time of the data strobe signal as determined by a standard of said main bus.

6. The computer system of claim 1, wherein said bus adapter has a driver for placing the data strobe on said main bus, a driver for placing the second data acknowledgment signal on said expansion bus, a receiver for receiving the first data acknowledgment signal from the main bus and transmitting it to said means of said bus adapter to interface the bus adapter with the main bus, receiver means for receiving the data strobe enable signal from said expansion bus and transmitting it to the means of said bus adapter, and a receiver for receiving the data strobe suppression signal from said expansion bus and transmitting it to the means of said bus adapter.

7. The computer system of claim 1, wherein said bus adapter means include an AND gate having inputs of negation of said first data acknowledgment signal received from said main bus and said data strobe enable signal received from said expansion bus to produce a selector output, a selector latch having a selector input connected to the selector output of said AND gate, said selector latch having a selector first input connected to receive the data strobe enable signal from said expansion bus, an output, a second input connected directly to said output of said selector latch for receiving the selector latch output as the second input, means responsive to one state of said selector input for connecting said first input to said output and responsive to a second state of said selector input for connecting said second input to said output, and an enable input connected to receive the data strobe suppression signal from said expansion bus to set said output at one fixed state according to one input of said enable input and to set the output at the selected input according to another state of said enable input.

8. The computer system of claim 1, wherein said master unit has a data transfer flag and said master unit means generating the data strobe enable signal in response to the flag.

9. The computer system of claim 1, wherein said master unit means differentiates a state change edge of the second data acknowledgment signal from said expansion bus for synchronizing the timing of the data strobe suppression signal.

10. A data transfer system for transferring data, comprising:

a master unit;

a slave unit;

a bus adapter, including interlock control signal means for issuing a data strobe to said slave unit;

an expansion bus for transferring control signals between said master unit and said bus adapter;

a main bus connected between said slave unit and said bus adapter, wherein said slave unit issues a first data acknowledgment signal over the main bus in response to receiving the data strobe from the bus adapter over the main bus;

said bus adapter having means responsive to said first data acknowledgment signal on said main bus for issuing a second data acknowledgment signal to said master unit over said expansion bus.

11. The data transfer system according to claim 10, wherein said master unit includes means for issuing a data strobe enable signal and a data strobe suppression signal over said expansion bus to said bus adapter, and wherein said interlock control signal means has a latch for controlling the data strobe on said main bus to set the data strobe in response to the data strobe enable signal on the expansion bus and in response to at least one of the data strobe suppression signal on the expansion bus and the first data acknowledgment signal on the main bus without necessitating transfer of the second data acknowledgment signal from the bus adapter to the master unit, and to reset the data strobe signal in response to the data strobe suppression signal on said expansion bus.

12. The data transfer system according to claim 11, wherein said main bus has a standard least time required for the data strobe to be negated between reset and set, wherein said master unit controls the time width of a pulse of the data strobe suppression signal according to the standard, and wherein said bus adapter is responsive to the time width of the data strobe suppression signal generated by said master unit for controlling the minimum time that the data strobe signal is negated.

13. The data transfer system according to claim 10, wherein said master unit includes means for issuing a data strobe suppression signal over said expansion bus to said bus adapter, and wherein said master unit is responsive to only one of a rising edge or falling edge of the second data acknowledgment signal on said expansion bus for generating timing of the data strobe suppression signal placed on the expansion bus by said master unit.

14. The data transfer system according to claim 10, wherein said master unit includes means for issuing a data strobe suppression signal over said expansion bus to said bus adapter, wherein said main bus has a standard least time required for the data strobe to be negated between reset and set, wherein said master unit controls the time width of a pulse of the data strobe suppression signal according to the standard, and wherein said bus adapter is responsive to the time width of the data strobe suppression signal generated by said master unit for controlling the minimum time that the data strobe signal is negated.

15. The data transfer system according to claim 14, wherein said master unit is responsive to only one of a rising edge or falling edge of the second data acknowledgment signal on said expansion bus for generating timing of the data strobe suppression signal placed on the expansion bus by said master unit.

16. The data transfer system according to claim 15, wherein said master unit further includes means for issuing a data strobe enable signal over said expansion bus to said bus adapter, wherein said interlock control signal means has a latch for controlling the data strobe on said main bus to set the data strobe in response to the data strobe enable signal on the expansion bus and in response to at least one of the data strobe suppression signal on the expansion bus and the first data acknowledgment signal on the main bus without necessitating transfer of the second data acknowledgment signal from the bus adapter to the master unit, and to reset the data strobe signal in response to the data strobe suppression signal on said expansion bus.

17. A data transfer system for transferring data, comprising:

a master unit;

a bus adapter;

an expansion bus for transferring control signals between said master unit and said bus adapter;

a slave unit for receiving a data strobe and in response thereto issuing a data acknowledgment signal;

a main bus connected between said slave unit and said bus adapter for transferring the data strobe and the data acknowledgment signal as control signals between said slave unit and said bus adapter;

said master unit having handshake initiating means for initiating interlock control data transfer handshaking; and said bus adapter having interlock control signal means responsive to said handshake initiating means initiating the handshaking over the expansion bus for issuing the data strobe over the main bus to the slave unit, and being responsive to the data acknowledgment signal on the main bus from the slave unit for issuing the data strobe on the main bus to the slave unit for starting additional transfer cycles without requiring transfer of the data acknowledgment signal from said bus adapter to said master unit.

18. The data transfer system according to claim 17, wherein said handshake initiating means further issues a signal to end data transfer, and wherein said interlock control signal means is responsive to said signal to end data transfer from said handshake initiating means to prevent further issuing of the data strobe from said bus adapter to said slave unit over said main bus.

19. The data transfer system according to claim 18, wherein said bus adapter transfers the data acknowledgment signal from said main bus to said expansion bus;

wherein said handshake initiating means is responsive to the data acknowledgment signal on said expansion bus for issuing a pulse timing signal of fixed pulse width having a timing derived from the timing of the data acknowledgment signal on said expansion bus; and wherein said bus adapter is responsive to the timing of said pulse timing signal for controlling the negation of the data strobe.

20. The data transfer system according to claim 19, wherein said interlock control signal means is responsive to the pulse width of the pulse timing signal for controlling the minimum negation time of the data strobe.

21. The data transfer system according to claim 20, wherein said interlock control signal means includes an AND gate and a latch.

22. The data transfer system according to claim 21, wherein said handshake initiating means differentiates the leading edge of the data acknowledgment signal on said expansion bus for determining the timing of the pulse timing signal placed on said expansion bus.

23. The data transfer system according to claim 17, wherein said bus adapter transfers the data acknowledgment signal from said main bus to said expansion bus;

wherein said handshake initiating means is responsive to the data acknowledgment signal on said expansion bus for issuing a pulse timing signal of fixed pulse width having a timing derived from the timing of the data acknowledgment signal on said expansion bus; and wherein said bus adapter is responsive to the timing of said pulse timing signal for controlling the negation of the data strobe.

24. The data transfer system according to claim 23, wherein said interlock control signal means is responsive to the pulse width of the pulse timing signal for controlling the minimum negation time of the data strobe.

25. The data transfer system according to claim 17, wherein said interlock control signal means includes an AND gate and a latch.

26. The data transfer system according to claim 17, wherein said handshake initiating means differentiates the leading edge of the data acknowledgment signal on said expansion bus for determining the timing of the pulse timing signal placed on said expansion bus.

* * * * *